United States Patent [19]

Darland

[11] Patent Number: 5,497,816
[45] Date of Patent: Mar. 12, 1996

[54] POWER MITER TABLE SAW

[76] Inventor: Richard E. Darland, 427 W. 13th St., Peru, Ind. 46970

[21] Appl. No.: 303,518

[22] Filed: Sep. 9, 1994

[51] Int. Cl.⁶ ..................................................... B25N 1/00
[52] U.S. Cl. ...................... 144/287; 83/471.3; 83/477.2; 144/286 A; 248/676
[58] Field of Search ..................................... 248/676, 677, 248/678; 83/574, 471.3, 477.2; 144/285, 286 R, 286 A, 287, 1 R; 108/179, 90, 113, 119; 269/901

[56] References Cited

U.S. PATENT DOCUMENTS

| | | | |
|---|---|---|---|
| 1,864,840 | 6/1932 | Lehner | 144/287 |
| 3,931,751 | 1/1976 | Simonson | 83/477.2 |
| 4,335,765 | 6/1982 | Murphy | 144/286 R |
| 4,860,807 | 8/1989 | Vacchiano | 83/471.3 |
| 4,874,025 | 10/1989 | Cleveland | 144/286 R |
| 5,004,029 | 4/1991 | Garner | 144/287 |
| 5,038,650 | 8/1991 | Hodge | 144/286 R |
| 5,082,037 | 1/1992 | Hammons et al. | 144/286 R |
| 5,105,862 | 4/1992 | Skinner et al. | 144/286 R |
| 5,320,150 | 6/1994 | Everts et al. | 144/287 |

*Primary Examiner*—W. Donald Bray

[57] ABSTRACT

A new and improved power mitre saw table comprised of a hollow base portion having a parallel and spaced apart front tube and a back tube. A plurality of apertures are formed in both the front tube and the back tube. Two support brackets are secured to the front tube and the back tube. Two hollow arm portions each of which has a parallel and spaced apart front arm and back arm. The front arm and the back arm each have a spring biased male detent element therein. Each arm is telescopically received in the front tube and the back tube with the male detent element optionally securing to one of the plurality of apertures thereof. A right guide and a left guide are each secured to the hollow base portion. A platform is secured to the two securement brackets of the hollow base portion. The platform is situated between the right guide and the left guide.

1 Claim, 4 Drawing Sheets

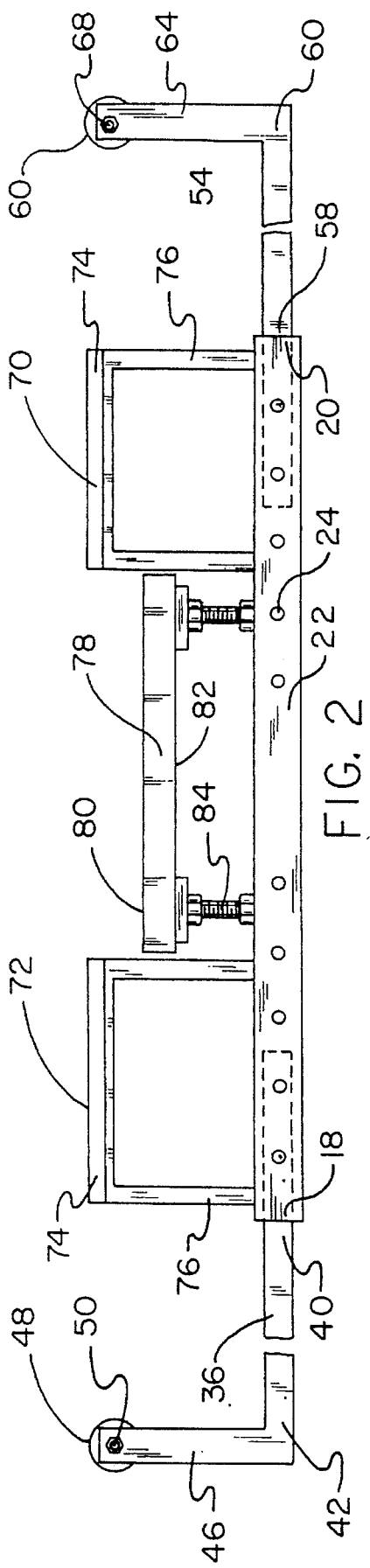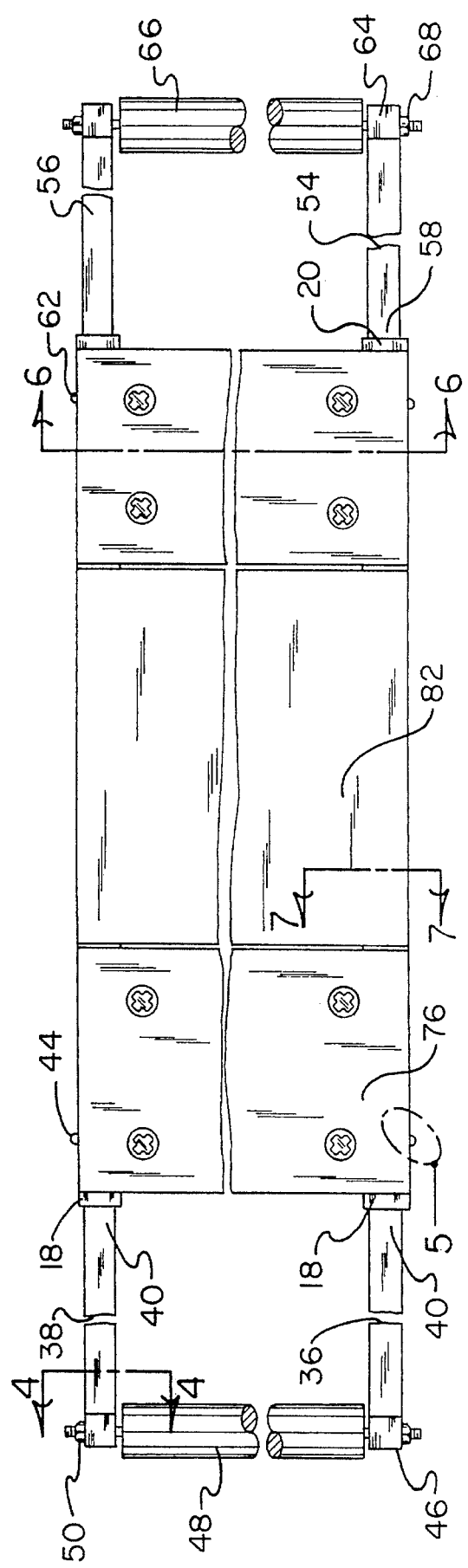

5,497,816

POWER MITER TABLE SAW

BACKGROUND OF THE INVENTION

1. Field of the Invention

The present invention relates to a power mitre saw table and more particularly pertains to providing an adjustable table for use with a power mitre saw so as to cut prefect joints with a power mitre saw table.

2. Description of the Prior Art

The use of mitre saws is known in the prior art. More specifically, mitre saws heretofore devised and utilized for the purpose of cutting joints are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,964,450 to Hughes et al. discloses an extension for table saw.

U.S. Pat. No. 5,038,650 to Hodge discloses a miter saw support and extension.

U.S. Pat. No. Des. 287,694 to Miyamoto discloses the ornamental design for a mitre saw.

U.S. Pat. No. Des. 306,031 to Ushiwata discloses the ornamental design for a mitre saw.

U.S. Pat. No. 4,259,887 to Dean discloses a table saw mitre gauge extension.

While these devices fulfill their respective, particular objective and requirements, the aforementioned patents do not describe a power mitre saw table for providing an adjustable table for use with a power mitre saw so as to cut prefect joints.

In this respect, the power mitre saw table according to the present invention substantially departs from the conventional concepts and designs of the prior art, and in doing so provides an apparatus primarily developed for the purpose of providing an adjustable table for use with a power mitre saw so as to cut prefect joints.

Therefore, it can be appreciated that there exists a continuing need for new and improved power mitre saw table which can be used for providing an adjustable table for use with a power mitre saw so as to cut prefect joints. In this regard, the present invention substantially fulfills this need.

SUMMARY OF THE INVENTION

In the view of the foregoing disadvantages inherent in the known types of mitre saws now present in the prior art, the present invention provides an improved power mitre saw table. As such, the general purpose of the present invention, which will be described subsequently in greater detail, is to provide a new and improved power mitre saw table and method which has all the advantages of the prior art and none of the disadvantages.

To attain this, the present invention essentially comprises a hollow base portion having a parallel and spaced apart front tube and a back tube. The front tube and back tube each has an open first end, an open second end, and an intermediate extent therebetween. A plurality of apertures are formed in the intermediate extent of both the front tube and the back tube. Two support brackets each of which has a first end, a second end, and an intermediate extent therebetween. Each first end is secured to the intermediate extent of the front tube. Each second end is secured to the intermediate extent of the back tube. The device contains a hollow left arm portion having a parallel and spaced apart front arm and a back arm. The front arm and the back arm each has a first end and a second end. Each first end has a spring biased male detent element therein. Each first end is telescopically received in the open first end of the front tube and the back tube with the male detent element optionally securing to one of the plurality of apertures along the intermediate extent thereof. Each second end has a perpendicularly extending arm therefrom. A roller is secured between the perpendicularly extending arm of each second end by a fastening means. The device contains a hollow right arm portion having a parallel and spaced apart front arm and a back arm. The front arm and the back arm each has a first end and a second end. Each first end has a spring biased male detent element therein. Each first end is telescopically received in the open second end of the front tube and the back tube with the male detent element optionally securing to one of the plurality of apertures along the intermediate extent thereof. Each second end has a perpendicularly extending arm therefrom. A roller is secured between the perpendicularly extending arm of each second end by a fastening means. The device contains a right guide and a left guide each having an upper portion and a lower portion. The lower portion of the right guide is secured to a top surface of the hollow base portion inward of the open second end of the front tube and the back tube. The lower portion of the left guide is secured to the top surface of the hollow base portion inward of the open first end of the front tube and the back tube. The device contains a platform having an upper surface and a lower surface. The lower surface has an adjustable height securement means theresecured. The securement means is secured to the intermediate extent of the two securement brackets of the hollow base portion. The platform is situated between the right guide and the left guide.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved power mitre saw table which has all the advantages of the prior art mitre saws and none of the disadvantages.

It is another object of the present invention to provide a new and improved power mitre saw table which may be easily and efficiently manufactured and marketed.

It is a further object of the present invention to provide a new and improved power mitre saw table which is of durable and reliable construction.

An even further object of the present invention is to provide a new and improved power mitre saw table which is susceptible of a low cost of manufacture with regard to both materials and labor, and which accordingly is then susceptible of low prices of sale to the consuming public, thereby making such a power mitre saw table economically available to the buying public.

Still yet another object of the present invention is to provide a new and improved power mitre saw table which provides in the apparatuses and methods of the prior art some of the advantages thereof, while simultaneously overcoming some of the disadvantages normally associated therewith.

Even still another object of the present invention is to provide a new and improved power mitre saw table for providing an adjustable table for use with a power mitre saw so as to cut prefect joints.

Lastly, it is an object of the present invention to provide a new and improved power mitre saw table comprised of a hollow base portion having a parallel and spaced apart front tube and a back tube. A plurality of apertures are formed in both the front tube and the back tube. Two support brackets are secured to the front tube and the back tube. Two hollow arm portions each of which has a parallel and spaced apart front arm and back arm. The front arm and the back arm each have a spring biased male detent element therein. Each arm is telescopically received in the front tube and the back tube with the male detent element optionally securing to one of the plurality of apertures thereof. A right guide and a left guide are each secured to the hollow base portion. A platform is secured to the two securement brackets of the hollow base portion. The platform is situated between the right guide and the left guide.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a side view of the preferred embodiment of the present invention.

FIG. 3 is a bottom view of the preferred embodiment of the present invention.

The same reference numerals refer to the same parts through the various Figures.

DESCRIPTION OF THE PREFERRED EMBODIMENT

Figure 1:
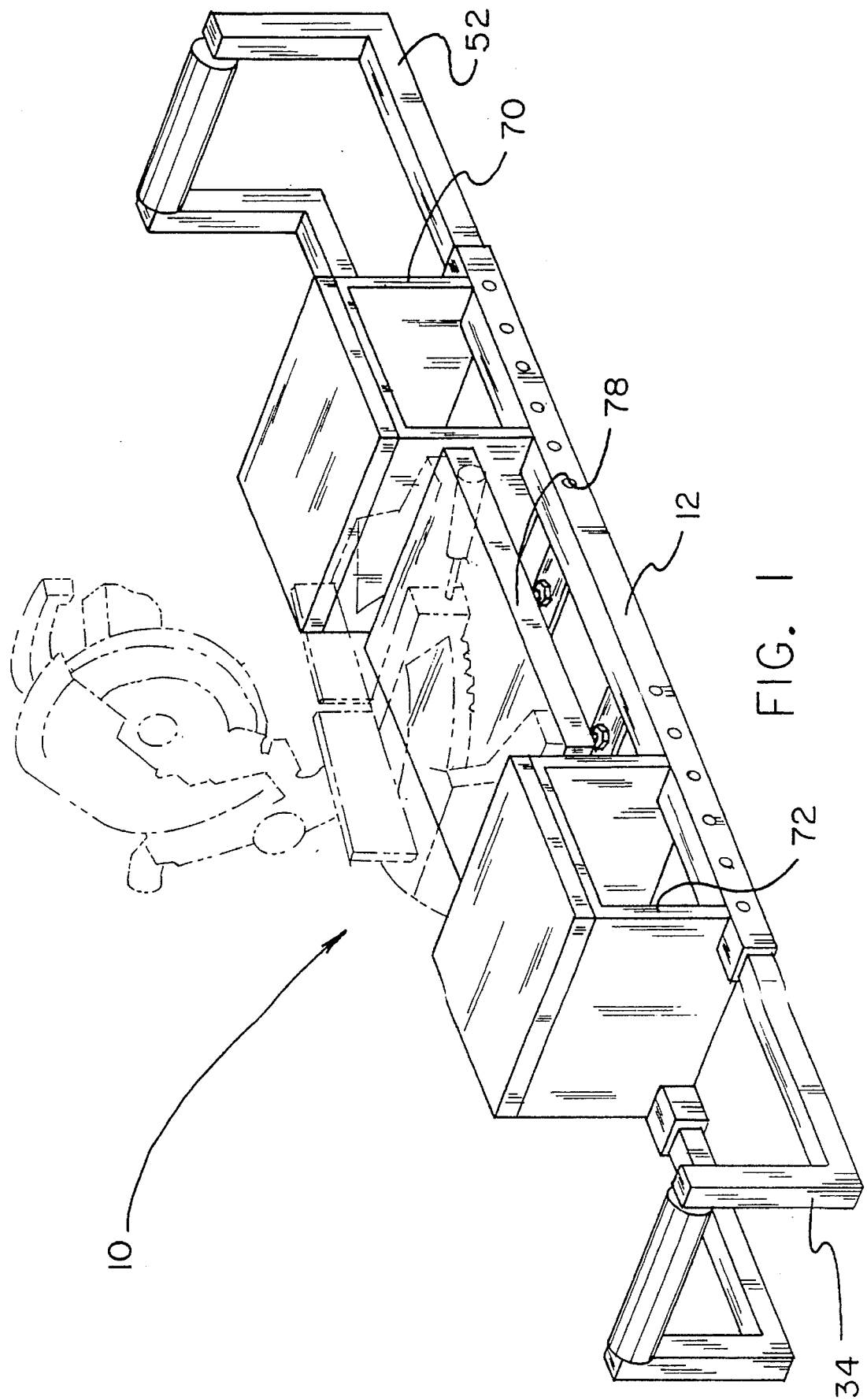
FIG. 1 is a perspective view of the preferred embodiment of the power mitre saw table constructed in accordance with the principles of the present invention.
Figure 4:
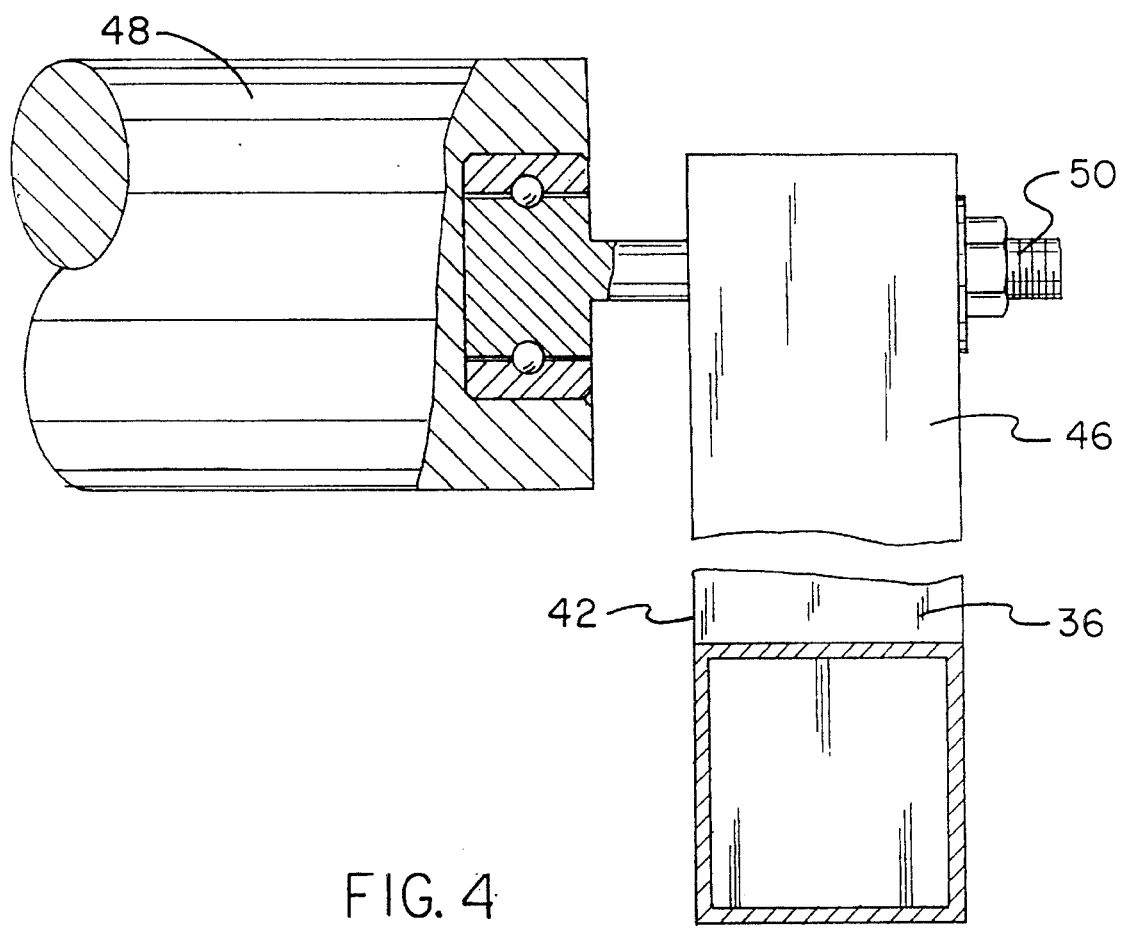
FIG. 4 is a cross-sectional view as seen along line 4—4 of FIG. 3.
Figure 5:
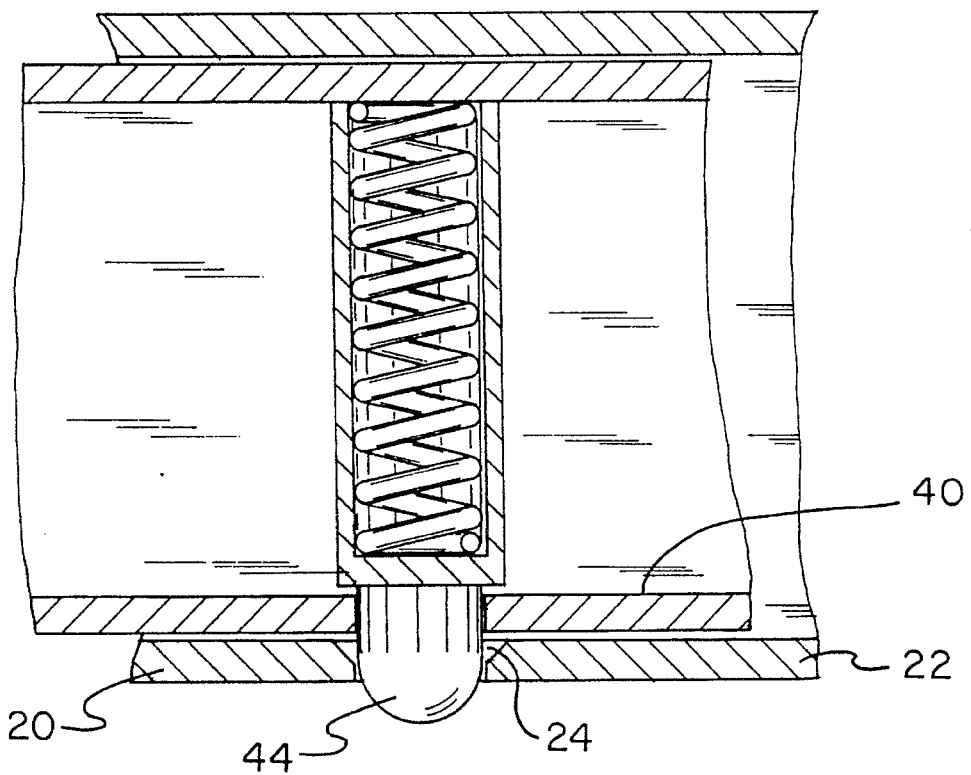
FIG. 5 is an enlarged view of the spring biased detent element of the present invention taken from FIG. 3.
Figure 6:
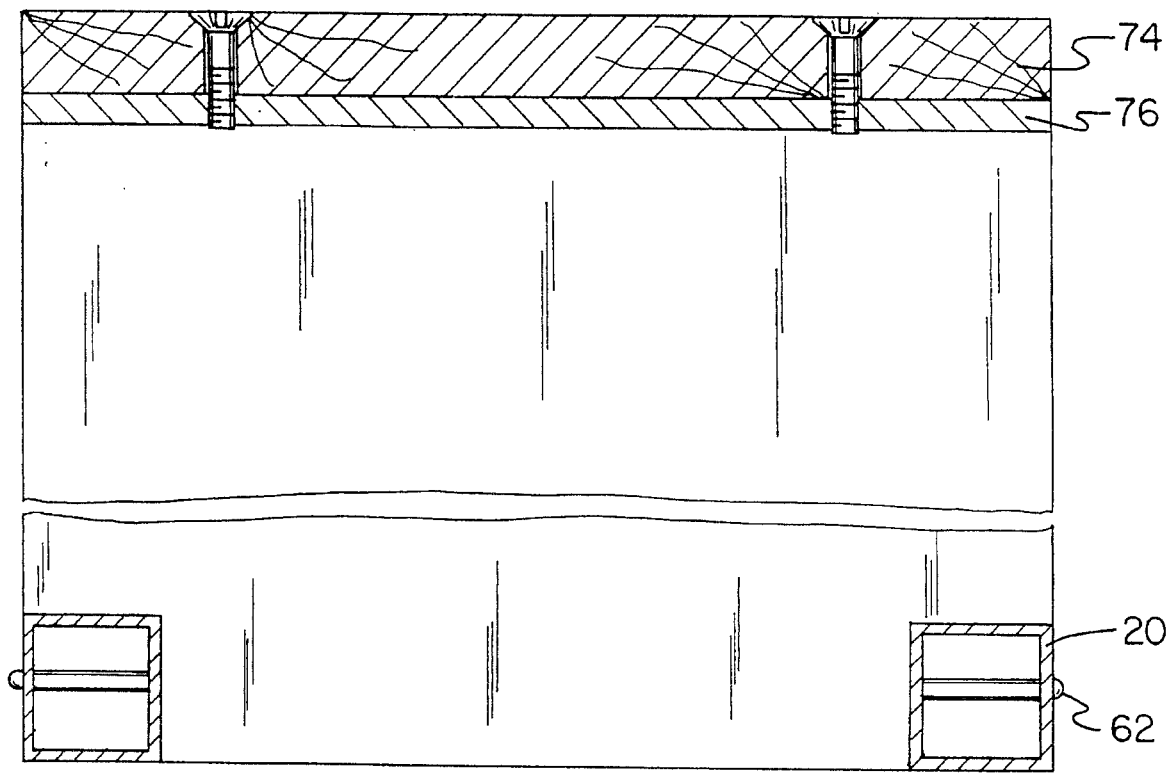
FIG. 6 is a cross-sectional view as seen along line 6—6 of FIG. 3.
Figure 7:
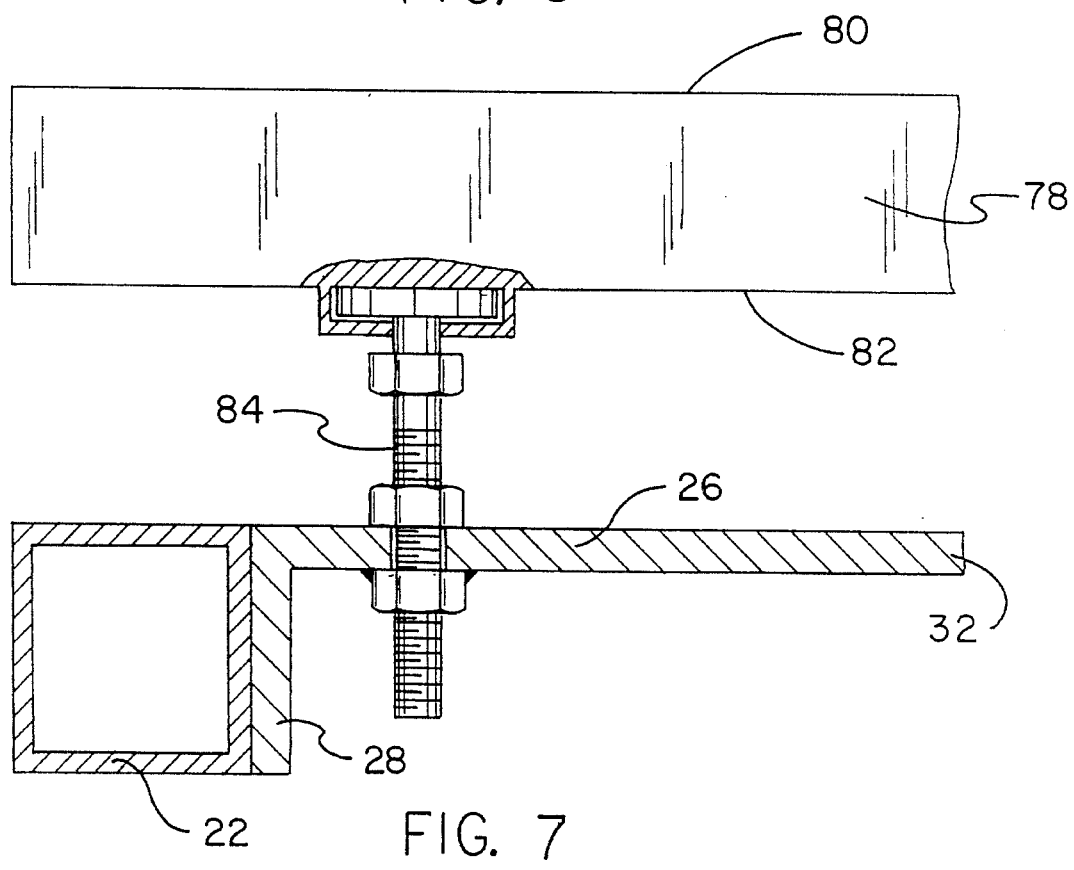
FIG. 7 is a cross-sectional view as seen along line 7—7 of FIG. 3.

With reference now to the drawings, and in particular, to FIG. 1 thereof, the preferred embodiment of the new and improved power mitre saw table embodying the principles and concepts of the present invention and generally designated by the reference number 10 will be described.

Specifically, it will be noted in the various Figures that the device relates to a new and improved power mitre saw table for providing an adjustable table for use with a power mitre saw so as to cut prefect joints. In its broadest context, the device consists of a hollow base portion, a hollow left arm portion, a hollow right arm portion, a right guide and a left guide, and a platform.

The device 10 contains a hollow base portion 12 having a parallel and spaced apart front tube 14 and a back tube 16. The front tube 14 and back tube 16 each has an open first end 18, an open second end 20, and an intermediate extent 22 therebetween. A plurality of apertures 24 are formed in the intermediate extent 22 of both the front tube 14 and the back tube 16. Two support brackets 26 each of which has a first end 28, a second end 30, and an intermediate extent 32 therebetween. Each first end 28 is secured to the intermediate extent 22 of the front tube 14. Each second end 30 is secured to the intermediate extent 22 of the back tube 16.

The device 10 contains a hollow left arm portion 34 having a parallel and spaced apart front arm 36 and a back arm 38. The front arm 36 and the back arm 38 each has a first end 40 and a second end 42. Each first end 40 has a spring biased male detent element 44 therein. Each first end 40 is telescopically received in the open first end 18 of the front tube 14 and the back tube 16 with the male detent element 44 optionally securing to one of the plurality of apertures 24 along the intermediate extent 22 thereof. Simply pressing the detent element 44 inward will release the first end 40 of the front arm 36 and the back arm 38 to adjust to a different length or to remove both arms 36,38 to transport the device 10. Each second end 42 has a perpendicularly extending arm 46 therefrom. A roller 48 is secured between the perpendicularly extending arm 46 of each second end 42 by a fastening means 50. The fastening means consists of a nut and bolt with ball bearings to easily rotate the roller 48. The roller 48 allows a user to easily slide a piece of wood onto the device 10 for use with a saw.

The device 10 contains a hollow right arm portion 52 having a parallel and spaced apart front arm 54 and a back arm 56. The front arm 54 and the back arm 56 each has a first end 58 and a second end 60. Each first end 58 has a spring biased male detent element 62 therein. Each first end 58 is telescopically received in the open second end 20 of the front tube 14 and the back tube 16 with the male detent element 62 optionally securing to one of the plurality of apertures 24 along the intermediate extent 22 thereof. Each second end 60 has a perpendicularly extending arm 64 therefrom. A roller 66 is secured between the perpendicularly extending arm 64 of each second end 60 by a fastening means 68.

The device 10 contains a right guide 70 and a left guide 72 each having an upper portion 74 and a lower portion 76. The lower portion 76 of the right guide 70 is secured to a top surface of the hollow base portion 12 inward of the open second end 20 of the front tube 14 and the back tube 16. The lower portion 76 of the left guide 72 is secured to the top surface of the hollow base portion 12 inward of the open first end 18 of the front tube 14 and the back tube 16. The right guide 70 and the left guide 72 function to hold a piece of wood in place to accurately cut at exactly the same angle.

The device 10 contains a platform 78 having an upper surface 80 and a lower surface 82. The lower surface 82 has an adjustable height securement means 84 theresecured. The securement means 84 is secured to the intermediate extent 32 of the two securement brackets 26 of the hollow base portion 12. The platform 78 is situated between the right guide 70 and the left guide 72. The upper surface 80 serves to mount a power mitre saw on it for use it cutting wood.

This table simplifies the cutting of miters so two pieces will fit perfectly together to form a corner joint. Perfect joints are particularly difficult to make when using shaped moldings. Contractors prefer to use power tools for all work, but no table mounted equipment is currently available for this purpose. Many non-professionals and some carpenters and cabinetmakers use mitre boxes or fixtures and handsaws to cut the pieces so they butt up well.

The product provides a table for use with a power mitre saw. It is about 8 feet in length, and the power saw is mounted in the center. Guide rails are provided on each side, extending the full length of the table so the work can be butted up to them. They ensure that each piece is cut at exactly the same angle in relation to the surface along the rails.

The height of this saw table could be adjustable to the most convenient working level for any particular job. For greater convenience, the length of the table could telescope to reduce the space required to transport it to the job. This may be accomplished by using a frame constructed of tubing. It could also be able to accommodate all makes and types of saws. Since it is used primarily on trim, the table construction could be lighter than that which would be required for larger and heavier work.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. A power mitre saw table for providing an adjustable table for use with a power mitre saw so as to cut prefect joints comprising, in combination:

a hollow base portion having a parallel and spaced apart front tube and a back tube, the front tube and back tube each having an open first end, an open second end, and an intermediate extent therebetween, a plurality of apertures formed in the intermediate extent of both the front tube and the back tube, two support brackets each of which having a first end, a second end, and an intermediate extent therebetween, each first end secured to the intermediate extent of the front tube, each second end secured to the intermediate extent of the back tube;

a hollow left arm portion having a parallel and spaced apart front arm and a back arm, the front arm and the back arm each having a first end and a second end, each first end having a spring biased male detent element therein, each first end telescopically received in the open first end of the front tube and the back tube with the male detent element optionally securing to one of the plurality of apertures along the intermediate extent thereof, each second end having a perpendicularly extending arm therefrom, a roller secured between the perpendicularly extending arm of each second end by a fastening means;

a hollow right arm portion having a parallel and spaced apart front arm and a back arm, the front arm and the back arm each having a first end and a second end, each first end having a spring biased male detent element therein, each first end telescopically received in the open second end of the front tube and the back tube with the male detent element optionally securing to one of the plurality of apertures along the intermediate extent thereof, each second end having a perpendicularly extending arm therefrom, a roller secured between the perpendicularly extending arm of each second end by a fastening means;

a right guide and a left guide each having an upper portion and a lower portion, the lower portion of the right guide secured to a top surface of the hollow base portion inward of the open second end of the front tube and the back tube, the lower portion of the left guide secured to the top surface of the hollow base portion inward of the open first end of the front tube and the back tube;

a platform having an upper surface and a lower surface, the lower surface having an adjustable height securement means theresecured, the securement means secured to the intermediate extent of the two securement brackets of the hollow base portion, the platform situated between the right guide and the left guide.

* * * * *